US012605822B2

(12) United States Patent
Kim

(10) Patent No.: US 12,605,822 B2
(45) Date of Patent: Apr. 21, 2026

(54) MOBILE ROBOT APPARATUS AND CONTROL METHOD THEREFOR

(71) Applicant: SAMSUNG ELECTRONICS CO., LTD., Suwon-si (KR)

(72) Inventor: Yongtae Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 217 days.

(21) Appl. No.: 18/195,059

(22) Filed: May 9, 2023

(65) Prior Publication Data

US 2023/0271312 A1      Aug. 31, 2023

Related U.S. Application Data

(63) Continuation of application No. PCT/KR2021/017854, filed on Nov. 30, 2021.

(30) Foreign Application Priority Data

Jan. 28, 2021      (KR) ......................... 10-2021-0012447

(51) Int. Cl.
*B25J 5/00* (2006.01)
*B25J 9/16* (2006.01)
(Continued)

(52) U.S. Cl.
CPC .............. *B25J 5/007* (2013.01); *B25J 9/161* (2013.01); *B25J 9/1651* (2013.01); *B25J 13/088* (2013.01); *B25J 19/023* (2013.01)

(58) Field of Classification Search
CPC . B25J 5/007; B25J 9/161; B25J 9/1651; B25J 13/088; B25J 19/023
See application file for complete search history.

(56) References Cited

U.S. PATENT DOCUMENTS 9,758,006 B2      9/2017  Jeong et al.
10,506,905 B2    12/2019  Son et al.
(Continued)

FOREIGN PATENT DOCUMENTS

JP      2006-247803 A      9/2006
JP      2008-272859 A     11/2008
(Continued)

OTHER PUBLICATIONS

International Search Report (PCT/ISA/210) issued by the International Searching Authority on Mar. 4, 2022 in International Application No. PCT/KR2021/017854.
(Continued)

*Primary Examiner* — Wade Miles
*Assistant Examiner* — Jerrod Irvin Davis
(74) *Attorney, Agent, or Firm* — Sughrue Mion, PLLC

(57) ABSTRACT

A mobile robot apparatus includes a main body; a first wheel and a second wheel respectively provided on opposite sides of the main body; a first driving device configured to rotate the first wheel and the second wheel; a second driving device configured to rectilinearly move the main body along a reference axis that is offset from a vertical line in a direction toward a front of the main body by a predetermined angle; and at least one processor configured to: based on the mobile apparatus accelerating, control the second driving device to cause the main body to move in a traveling direction of the mobile apparatus, and based on the mobile apparatus decelerating, control the second driving device to cause the main body to move in a direction opposite to the traveling direction.

14 Claims, 11 Drawing Sheets

(51) Int. Cl.
B25J 13/08 (2006.01)
B25J 19/02 (2006.01)

(56) References Cited

U.S. PATENT DOCUMENTS

| | | | | |
|---|---|---|---|---|
| 2004/0182614 A1* | 9/2004 | Wakui | .................... | G06N 3/008 |
| | | | | 180/7.1 |
| 2011/0209929 A1 | 9/2011 | Heinzmann et al. | | |
| 2019/0381852 A1 | 12/2019 | Lee et al. | | |
| 2020/0124159 A1 | 4/2020 | Weiss | | |
| 2020/0409365 A1* | 12/2020 | Takagi | .................... | G05D 1/00 |
| 2023/0098075 A1 | 3/2023 | Koo et al. | | |

FOREIGN PATENT DOCUMENTS

| | | | |
|---|---|---|---|
| JP | 2010-264555 A | 11/2010 | |
| JP | 2020-152149 A | 9/2020 | |
| KR | 2001-0089835 A | 10/2001 | |
| KR | 10-2011-0132745 A | 12/2011 | |
| KR | 10-1287593 B1 | 7/2013 | |
| KR | 10-2016-0015435 A | 2/2016 | |
| KR | 10-1925127 B1 | 12/2018 | |
| KR | 10-2106303 B1 | 5/2020 | |
| KR | 10-2020-0072032 A | 6/2020 | |
| WO | WO-2014162605 A1 * | 10/2014 | .......... B62D 57/022 |

OTHER PUBLICATIONS

Written Opinion (PCT/ISA/237) issued by the International Searching Authority on Mar. 4, 2022 in International Application No. PCT/KR2021/017854.
Communication dated Mar. 15, 2024, issued by the European Patent Office in European Application No. 21923407.7.
Communication issued Apr. 28, 2025 by the European Patent Office in European Patent Application No. 21923407.7.
Communication issued Jul. 3, 2025 by the Korean Intellectual Property Office in Korean Patent Application No. 10-2021-0012447.

* cited by examiner

MOBILE ROBOT APPARATUS AND CONTROL METHOD THEREFOR

CROSS-REFERENCE TO RELATED APPLICATIONS

This application is a by-pass continuation of International Application No. PCT/KR2021/017854, filed on Nov. 30, 2021, which is based on and claims priority to Korean Patent Application No. 10-2021-0012447, filed on Jan. 28, 2021, in the Korean Intellectual Property Office, the disclosures of which are incorporated by reference herein in their entireties.

BACKGROUND

1. Field

The disclosure relates to a mobile robot apparatus and a control method therefor, and more particularly, to a mobile robot apparatus that can travel stably via self-balancing implemented by a main body that rectilinearly moves relatively to wheels along an inclined reference axis, and a control method therefor.

2. Description of Related Art

As robot technologies have developed, supply of robots is becoming generalized not only in specialized academic fields or industrial fields requiring a grand scale labor force but also in general homes. Also, not only are robots performing functions while their positions are fixed being distributed, but two-wheeled robots that can move their positions are also being distributed.

In the related art, a two-wheeled robot generally performs self-balancing control by inclining the main body forward or backward. However, where a robot utilizes image data detected by a camera or a sensor, an angle of view of the camera or the sensor arranged on the main body continually changes, and thus there is a problem that it is difficult to detect an obstacle or generate a dynamic path.

SUMMARY

Provided are a mobile robot apparatus that can travel stably via self-balancing implemented by a main body that rectilinearly moves relatively to wheels along an inclined reference axis, and a control method therefor.

According to an aspect of the disclosure, a mobile apparatus includes: a main body; a first wheel and a second wheel respectively provided on opposite sides of the main body; a first driving device configured to rotate the first wheel and the second wheel; a second driving device configured to rectilinearly move the main body along a reference axis that is offset from a vertical line in a direction toward a front of the main body by a predetermined angle; and at least one processor configured to: based on the mobile apparatus accelerating, control the second driving device to cause the main body to move in a traveling direction of the mobile apparatus, and based on the mobile apparatus decelerating, control the second driving device to cause the main body to move in a direction opposite to the traveling direction.

The at least one processor may be further configured to cause the main body to move to a first position at which a center of gravity of the main body is located forward from a grounding point of the first wheel and a grounding point of the second wheel or to move to a second position at which the center of gravity of the main body is located behind the grounding point of the first wheel and the grounding point of the second wheel.

The at least one processor may be further configured to: based on the mobile apparatus accelerating forward or decelerating backward, control the second driving device to cause the main body to move to the first position, and based on the mobile apparatus decelerating forward or accelerating backward, control the second driving device to cause the main body to move to the second position.

The at least one processor may be further configured to, based on the mobile apparatus moving at a constant velocity, control the second driving device to cause the main body to move to a third position between the first position and the second position.

The mobile apparatus may further include a tilt sensor configured to detect a tilt of the main body.

The at least one processor may be further configured to control the first driving device to maintain the tilt of the main body while the mobile apparatus is moving based on a signal received from the tilt sensor.

The mobile apparatus may further include a camera configured to photograph a surrounding environment of the mobile apparatus.

The camera may be provided on a front surface of the main body.

The mobile apparatus may further include an acceleration sensor configured to detect acceleration or deceleration of the mobile apparatus.

The first driving device may include: a first motor configured to provide a driving force to the first wheel; and a second motor configured to provide a driving force to the second wheel.

The second driving device may include: a first rack provided inside the first wheel; a second rack provided inside the second wheel; a first pinion engaged with the first rack; a second pinion engaged with the second rack; a third motor configured to rotate the first pinion; and a fourth motor configured to rotate the second pinion.

The first wheel may include: a first wheel cover that is rotatable; and a first middle member between the first wheel cover and the main body, the second wheel may include: a second wheel cover that is rotatable; and a second middle member between the second wheel cover and the main body, and the first rack may be provided on the first middle member, and the second rack may be provided on the second middle member.

The mobile apparatus may further include: a guide rail arranged on at least one of the first middle member and the second middle member, and the main body may include a block that is movable along the guide rail.

According to an aspect of the disclosure, a method of controlling a mobile apparatus including a main body and a first wheel and a second wheel respectively provided at both sides of the main body, the method includes: based on sensing acceleration of the mobile apparatus, causing the main body of the mobile apparatus to move in a traveling direction of the mobile apparatus; and based on sensing a deceleration of the mobile apparatus, causing the main body to move in a direction opposite from the traveling direction, wherein the main body is configured to rectilinearly move along a reference axis that is offset from a vertical line in a direction toward a front of the main body by a predetermined angle.

The causing the main body of the mobile apparatus to move in the traveling direction may include: based on the mobile apparatus accelerating forward, causing the main body to move to a first position at which a center of gravity of the main body is located forward from a grounding point of the first wheel and a grounding point the second wheel; and based on the mobile apparatus accelerating backward, causing the main body to move to a second position at which the center of gravity of the main body is located behind the grounding point of the first wheel and the second wheel, and the causing the main body of the mobile apparatus to move in the direction opposite from the traveling direction may include: based on the mobile apparatus decelerating forward, causing the main body to move to the second position; and based on the mobile apparatus decelerating backward, causing the main body to move to the first position.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DISCLOSURE

Figure 1:
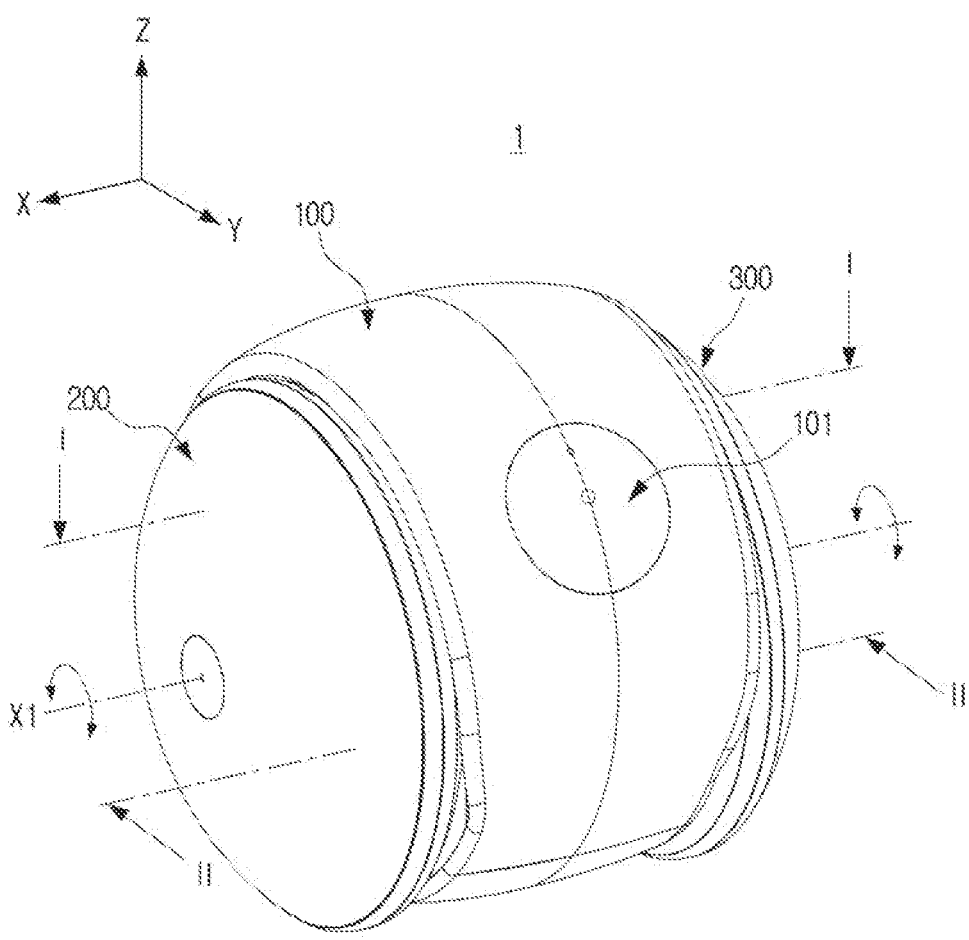
FIG. 1 is a perspective view of a mobile robot apparatus according to one or more embodiments of the disclosure.

The embodiments described below are examples, and it should be noted that the disclosure may be implemented while being modified in various forms, unlike the embodiments described herein. In explaining the disclosure below, in case it is determined that detailed explanation of related known functions or components may unnecessarily confuse the gist of the disclosure, the detailed explanation and detailed illustration will be omitted. Also, in the accompanying drawings, some components may not be illustrated according to their actual sizes but they may be illustrated in exaggerated sizes, for promoting understanding of the disclosure.

In addition, as terms used in this specification and the claims, general terms were selected in consideration of the functions described in the disclosure. However, the terms may vary depending on the intention of those skilled in the art who work in the pertinent field or legal or technical interpretation, and emergence of new technologies, etc. Also, there are some terms that were designated by the applicant on his own, and in such cases, the meaning of the terms may be interpreted as defined in this specification. Meanwhile, if there is no specific definition of the terms, the meaning of the terms may be interpreted based on the overall content of this specification and technical knowledge common in the pertinent technical field.

Further, in this specification, expressions such as "have," "may have," "include," and "may include" denote the existence of such characteristics (e.g.: elements such as numbers, functions, operations, and components), and do not exclude the existence of additional characteristics.

Further, it should be understood that, although the terms "first," "second," etc. may be used herein to describe various elements, the elements are not restricted by the terms, and the terms are only used to distinguish one element from another. For example, a first element could be termed a second element, and similarly, a second element could be termed a first element without departing from the scope of the disclosure. The term "and/or" includes combinations of one or all of a plurality of associated listed items. Expressions such as "at least one of," when preceding a list of components, modify the entire list of components and do not modify the individual components of the list. For example, the expression "at least one of a, b or c" indicates only a, only b, only c, both a and b, both a and c, both b and c, or all of a, b, and c.

Also, in this specification, elements necessary for description of each embodiment of the disclosure were explained, and thus elements are not necessarily limited thereto. Accordingly, some elements may be modified or omitted, or other elements may be added. In addition, elements may be arranged while being dispersed to apparatuses independent from one another.

Further, while the embodiments of the disclosure will be described in detail with reference to the following accompanying drawings and the content described in the accompanying drawings, it is not intended that the disclosure is restricted or limited by the embodiments.

Hereinafter, the disclosure will be described in more detail with reference to the accompanying drawings.

Figure 2:
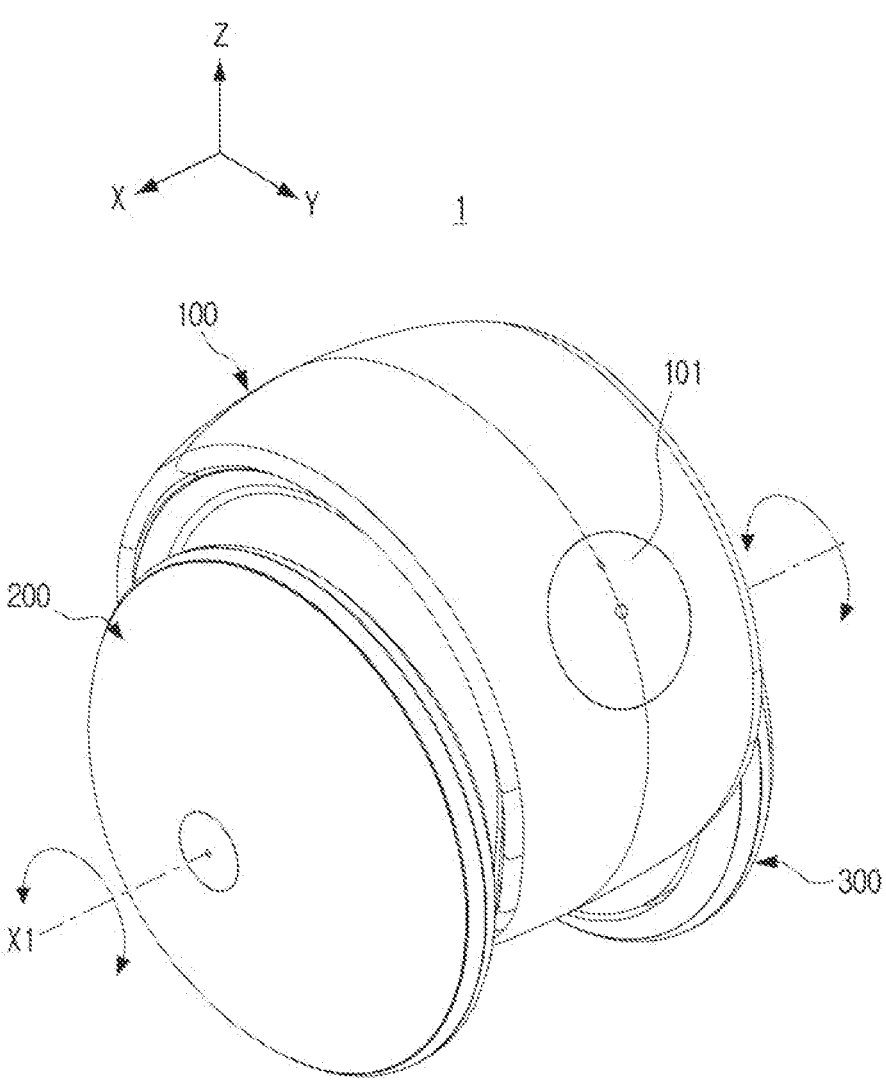
FIG. 2 is a perspective view indicating a state wherein the main body in FIG. 1 is raised.
Figure 3:
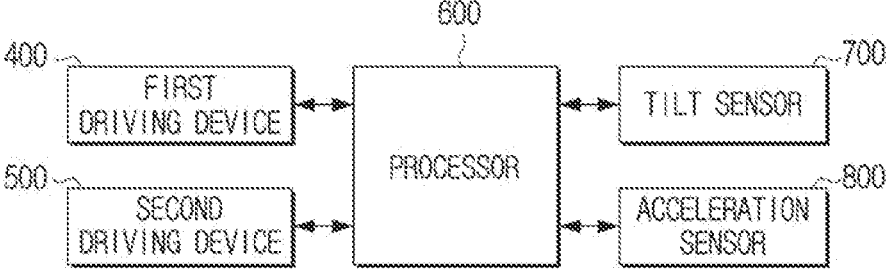
FIG. 3 is a block diagram for illustrating an operation of a mobile robot apparatus according to one or more embodiments of the disclosure.

FIG. 1 is a perspective view of a mobile robot apparatus according to one or more embodiments of the disclosure. FIG. 2 is a perspective view indicating a state wherein the main body in FIG. 1 ascended. FIG. 3 is a block diagram for illustrating an operation of a mobile robot apparatus according to one or more embodiments of the disclosure.

The mobile robot apparatus 1 is an apparatus having various functions such as recognizing the surrounding environment and being able to travel autonomously and collecting information, and transmitting information to a user, etc. The mobile robot apparatus 1 may recognize the surrounding environment based on recognition of voices, sounds, and images. Also, the mobile robot apparatus 1 may transmit information to a user by controlling another electronic product or outputting a voice through wireless communication.

The mobile robot apparatus 1 may enable stable autonomous traveling by collecting and analyzing various kinds of information such as sounds, voices, images, etc. in the surrounding environment. For example, the mobile robot apparatus 1 may include a microphone, a camera, a sensor, etc. for collecting information on the surrounding environment.

The mobile robot apparatus 1 may physically move by including a driving member, and may execute various functions of the mobile robot apparatus 1 across the overall environment of a user including the indoors and the outdoors through this.

In case the mobile robot apparatus 1 is used in a home, the mobile robot apparatus 1 may interact with electronic products such as a TV, a cleaner, a washing machine, etc. arranged in the home and execute functions and collect information, and transmit the collected information to the family members including a pet. Accordingly, all members in the home may be connected with the electronic products.

Even where the user is not present, the mobile robot apparatus 1 may continuously check and inspect the environment inside the home, and may connect a family member needing help including the pet and the user. Also, the mobile robot apparatus 1 may check and manipulate other home appliances in the home through a physical movement. Through this, the mobile robot apparatus 1 can promote safety and reinforce security inside the home.

The mobile robot apparatus 1 according to one or more embodiments of the disclosure may be implemented in a form of performing tasks inside a home, but is not limited thereto, and it may be implemented as robot apparatuses according to various embodiments.

Referring to FIG. 1 to FIG. 3, the mobile robot apparatus 1 according to one or more embodiments of the disclosure may include a main body 100, a first wheel 200 and a second wheel 300, a first driving device 400, a second driving device 500, a processor 600, a tilt sensor 700, and an acceleration sensor 800.

The covers of the main body 100, the first wheel 200, and the second wheel 300 may have the same curvature, and accordingly, the exterior of the mobile robot apparatus 1 may be formed to constitute a sphere. Specifically, the side surfaces of the first and second wheels 200, 300 may have a convex shape.

Inside the main body 100 of the mobile robot apparatus 1, a motor, a battery, an actuator, a gear, a bearing, etc. for driving the mobile robot apparatus 1 may be included.

On the outer surface of the main body 100, a camera 101 photographing the surrounding environment of the mobile robot apparatus 1 may be arranged. Specifically, the camera 101 may be arranged on the front surface of the main body 100, and photograph the front side of the mobile robot apparatus 1. The processor 600 may generate moving paths around an obstacle in the vicinity of the mobile robot apparatus 1 based on photographing information received from the camera 101.

Also, the main body 100 may include a tilt sensor 700 and an acceleration sensor 800 in its inside. However, types of sensors are not limited thereto, and the mobile robot apparatus 1 may include at least one of an image sensor detecting obstacles, a sound sensor detecting voices, a temperature sensor that can detect temperatures, or a humidity sensor detecting humidity.

The tilt sensor 700 may detect an angle at which the main body 100 is inclined, and in which direction the main body 100 is inclined, by detecting the direction of the acceleration of gravity.

The acceleration sensor 800 may detect acceleration of the main body 100. Specifically, the acceleration sensor 800 may detect the degree of acceleration of the main body 100 as it accelerates forward, the degree of deceleration of the main body 100 as it decelerates backward, or whether the main body 100 moves at a constant velocity.

The mobile robot apparatus 1 can recognize the surrounding environment based on information collected from the camera 101 and the at least one sensor 700 arranged on the main body 100, and travel autonomously and collect information, and transmit the information to a user.

The first wheel 200 and the second wheel 300 may be respectively arranged on either side of the main body 100.

Meanwhile, the first driving device 400 may rotate the first and second wheels 200, 300 respectively based on a center axis X1.

As the first and second wheels 200, 300 rotate based on the center axis X1, the mobile robot apparatus 1 may move forward or backward, or pivot, and may thereby move freely to a desired location.

The first and second wheels 200, 300 may respectively move in a state of adjoining the sides of the main body 100 along both of the sides of the main body 100. The first and second wheels 200, 300 may move up and down to be relatively rectilinear to the main body 100.

The second driving device 500 may move the main body 100 to become far from or close to the center axis X1 of the first and second wheels 200, 300.

For example, the main body 100 in FIG. 1 may be arranged to be adjacent to the center axis X1 of the first and second wheels 200, 300. Here, the first and second wheels 200, 300 may cover the entire sides of the main body 100.

Also, the main body 100, as shown in FIG. 2, may be arranged to be spaced apart from the center axis X1 of the first and second wheels 200, 300. Here, the first and second wheels 200, 300 may not cover the upper areas of the sides of the main body 100, and accordingly, the upper areas of the sides of the main body 100 may be exposed to the outside.

In case the mobile robot apparatus 1 needs to travel at a high speed, or needs to avoid an obstacle, the processor 600 may control the second driving device 500 so that the main body 100 moves to the upper side based on the center axis X1 of the first and second wheels 200, 300.

The main body 100 in FIG. 1 and FIG. 2 is illustrated to move up and down based on the vertical line, but the moving directions of the main body 100 are not limited thereto, and in a case where the main body 100 is inclined forward, the main body 100 may also move to the upper side on the front and the lower side on the rear.

The mobile robot apparatus 1 may include a processor 600 for controlling the operations of the mobile robot apparatus 1, and may include a sensor for recognizing the surrounding environment and a communication device for communicating with other electronic apparatuses.

The processor 600 may control the overall operations of the mobile robot apparatus 1. For this, the processor may include one or more of a central processing unit (CPU), an application processor (AP), or a communication processor (CP). Also, the processor may be a micro control unit (MCU).

The processor 600 may drive the operation system or an application program and control hardware or software components connected to the processor 600, and perform various kinds of data processing and operations. Also, the processor 600 may load an instruction or data received from at least one of other components on a volatile memory and process them, and store various data in a non-volatile memory.

The processor 600 may control the first driving device 400 and the second driving device 500 based on information received from the camera 101, the tilt sensor 700, and the acceleration sensor 800. The content regarding the feature that the processor 600 controls the first and second driving devices 400, 500 will be described in detail later.

Figure 4:
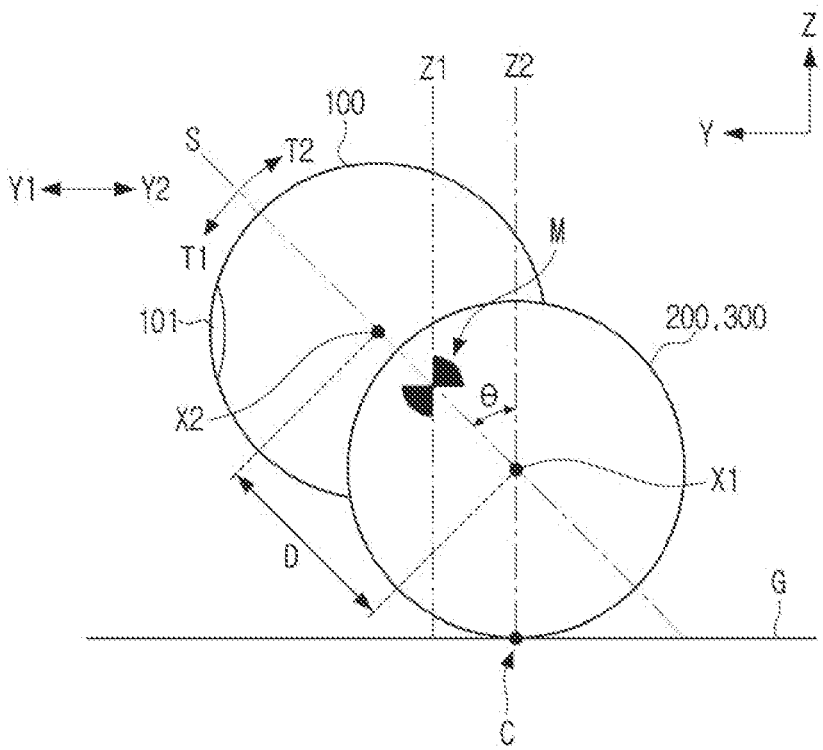
FIG. 4 is a side surface view indicating a state wherein a mobile robot apparatus is accelerating.
Figure 5:
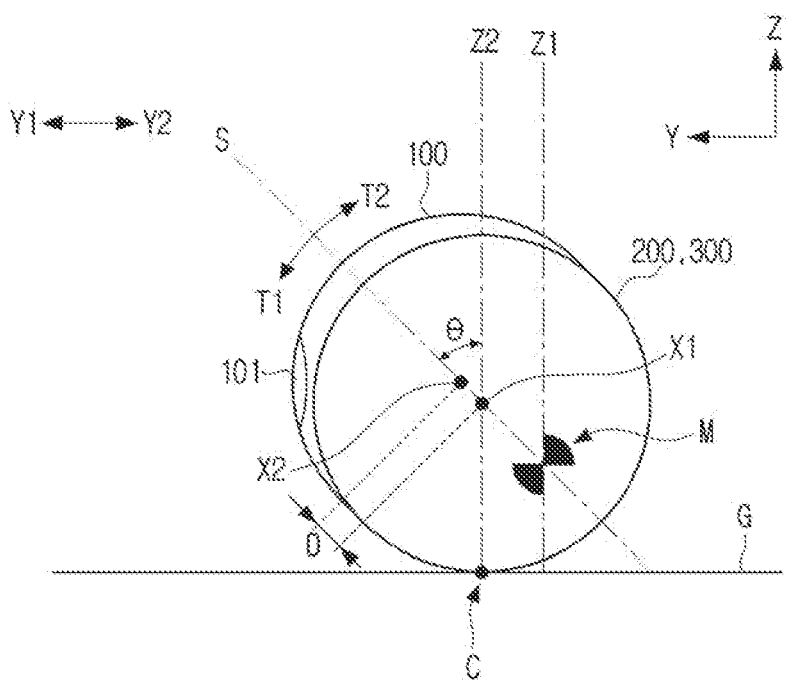
FIG. 5 is a side surface view indicating a state wherein a mobile robot apparatus is decelerating.
Figure 6:
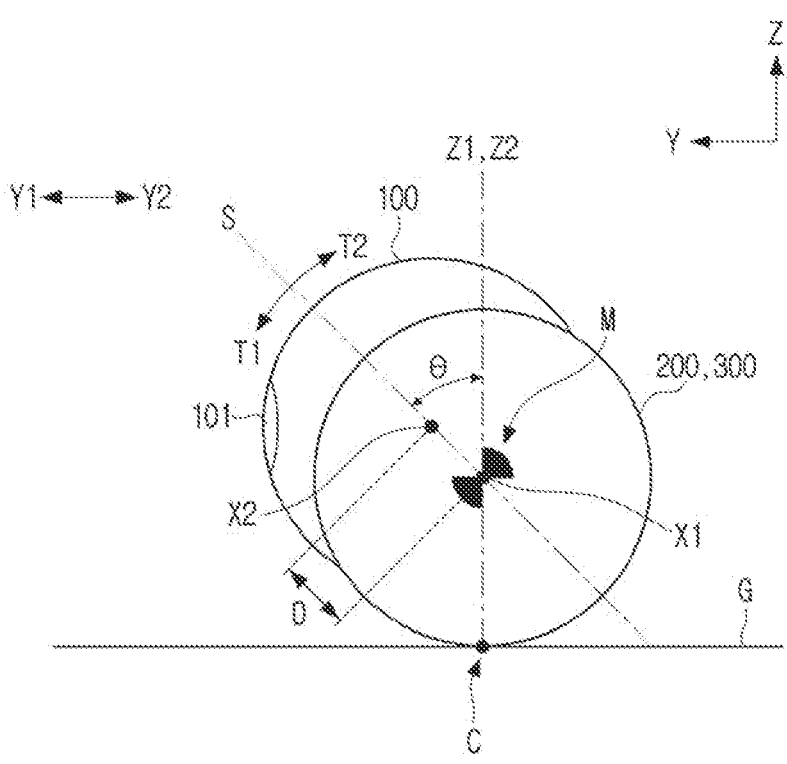
FIG. 6 is a side surface view indicating a state wherein a mobile robot apparatus moves at a constant velocity.

FIG. 4 is a side surface view indicating a state wherein a mobile robot apparatus is accelerating. FIG. 5 is a side surface view indicating a state wherein a mobile robot apparatus is decelerating. FIG. 6 is a side surface view indicating a state wherein a mobile robot apparatus moves at a constant velocity.

Referring to FIG. 4 to FIG. 6, the second driving device 500 may rectilinearly move the main body 100 along a reference axis S inclined at a predetermined angle θ more forward than the vertical line Z2.

The predetermined angle θ may be 5 degrees or larger and 60 degrees or smaller, but the angle is not limited to this range.

That is, the mobile robot apparatus 1 may move while the main body 100 is inclined to the front side Y1. For this, if the mobile robot apparatus 1 moves backward for a short time and then stops before departing to the front side Y1, the main body 100 may be arranged to be inclined to the front side Y1 by an inertia torque in the T1 direction.

Referring to FIG. 4 and FIG. 5, the processor 600 may control the second driving device 500 so that, if the mobile robot apparatus 1 accelerates, the main body 100 moves in the traveling direction of the mobile robot apparatus 1.

Also, the processor 600 may control the second driving device 500 so that, if the mobile robot apparatus 1 decelerates, the main body 100 moves in the opposite direction of the traveling direction of the mobile robot apparatus 1.

Specifically, referring to FIG. 4, the processor 600 may control the second driving device 500 so that, if the mobile robot apparatus 1 accelerates forward to the front side Y1, or decelerates backward to the rear side Y2, the main body 100 moves to the front side Y1.

That is, the center axis X2 of the main body 100 may rectilinearly move to be far from the center axis X1 of the first and second wheels 200, 300 along the reference axis S. Accordingly, the distance D between the center axis X1 of the first and second wheels 200, 300 and the center axis X2 of the main body 100 may become longer.

Accordingly, the main body 100 may move to a first position wherein the center of gravity M of the main body 100 is located more to the front side Y1 than the grounding point C of the first and second wheels 200, 300. That is, the vertical line Z1 going through the center of gravity M of the main body 100 may be located more to the front side Y1 than the vertical line Z2 going through the grounding point C.

A compensation torque in the T1 direction (the counter-clockwise direction in FIG. 4) may be applied to the mobile robot apparatus 1 by the gravity applied to the center of gravity M of the main body 100 that moved to the first position. As the mobile robot apparatus 1 accelerates toward the front side Y1, or decelerates toward the rear side Y2, an inertia torque in the T2 direction (the clockwise direction in FIG. 4) may be applied.

That is, a compensation torque in the T1 direction by gravity and an inertia torque in the T2 direction by inertial force are applied simultaneously to the mobile robot apparatus 1, and thus the torques may offset one another.

Accordingly, the mobile robot apparatus 1 may not be inverted to the front side Y1 or the rear side Y2, but may accelerate forward toward the front side Y1 or decelerate backward toward the rear side Y2 stably.

Also, referring to FIG. 5, the processor 600 may control the second driving device 500 so that, if the mobile robot apparatus 1 decelerates forward to the front side Y1 or accelerates backward to the rear side Y2, the main body 100 moves to the rear side Y2.

Specifically, the center axis X2 of the main body 100 may rectilinearly move to be close to the center axis X1 of the first and second wheels 200, 300 along the reference axis S. Accordingly, the distance D between the center axis X1 of the first and second wheels 200, 300 and the center axis X2 of the main body 100 may become shorter.

Accordingly, the main body 100 may move to a second position wherein the center of gravity M of the main body 100 is located more to the rear side Y2 than the grounding point C of the first and second wheels 200, 300. That is, the vertical line Z1 going through the center of gravity M of the main body 100 may be located more to the rear side Y2 than the vertical line Z2 going through the grounding point C.

A compensation torque in the T2 direction (the clockwise direction in FIG. 5) may be applied to the mobile robot apparatus 1 by the gravity applied to the center of gravity M of the main body 100 that moved to the second position. As the mobile robot apparatus 1 decelerates toward the front side Y1 or accelerates toward the rear side Y2, and an inertia torque in the T1 direction (the counterclockwise direction in FIG. 5) may be applied.

That is, a compensation torque in the T2 direction by gravity and an inertia torque in the T1 direction by inertial force are applied simultaneously to the mobile robot apparatus 1, and thus the torques may offset one another.

Accordingly, the mobile robot apparatus 1 may not be inverted to the front side Y1 or the rear side Y2, but may decelerate forward toward the front side Y1 or accelerate backward toward the rear side Y2 stably.

Also, the processor 600 may control the first driving device 400 so that the tilt of the main body 100 is maintained while the mobile robot apparatus 1 is moving based on a signal received from the tilt sensor 700.

If the first driving device 400 decreases the rotation angular velocity of the first and second wheels 200, 300, the main body 100 may be further inclined to the front side Y1 by inertia. On the contrary, if the first driving device 400 increases the rotation angular velocity of the first and second wheels 200, 300, the main body 100 may be further inclined to the rear side Y2. That is, according to the first driving device 400 increasing or decreasing the rotation angular velocity of the first and second wheels 200, 300, the tilt of the main body 100 may be adjusted.

The processor 600 may perform a PID control based on a tilt value of the main body 100 received from the tilt sensor 700, and thus the mobile robot apparatus 1 may move in an inclined state while the main body 100 maintains a predetermined angle.

Accordingly, the reference axis S which is the moving path of the main body 100 may be maintained at a regular angle θ with the vertical line Z2.

Meanwhile, even if self-balancing of the mobile robot apparatus 1 is performed through the aforementioned process, as the main body 100 is inclined at a regular angle, the camera 101 arranged on the front surface of the main body 100 may also photograph the front side always at a specific angle of view.

That is, the camera 101 photographs the surrounding environment of the mobile robot apparatus 1 at a regular angle of view in all cases wherein the mobile robot apparatus 1 accelerates, decelerates, and moves at a constant velocity, and thus the camera 101 may photograph the surrounding environment precisely and stably. Accordingly, through the image data stably collected by the camera 101, the mobile robot apparatus 1 can easily detect an obstacle, and can generate a precise dynamic path.

Referring to FIG. 6, the processor 600 may control the second driving device 500 so that, if the mobile robot apparatus 1 moves at a constant velocity, the main body 100 moves to a third position arranged between the first and second positions.

Specifically, the main body 100 may be arranged to be adjacent to the grounding point C of the first and second wheels 200, 300 in the third position. That is, the vertical line Z1 going through the center of gravity M of the main body 100 may be located to be adjacent to the vertical line Z2 going through the grounding point C.

It was illustrated that the center of gravity M of the main body 100 is arranged on the same vertical line as the grounding point C in the third position. However, the location is not limited thereto, and the center of gravity M of the main body 100 may be arranged inside a support polygon of the mobile robot apparatus 1 in the third position, and a torque by the gravity of the main body 100 may not be applied to the mobile robot apparatus 1.

In case the mobile robot apparatus 1 moves at a constant velocity, the mobile robot apparatus 1 does not receive both of an inertia torque by acceleration or deceleration and a compensation torque by the center of gravity of the main body 100, and thus the mobile robot apparatus 1 may travel stably without being inverted to the front side or the rear side.

Figure 7:
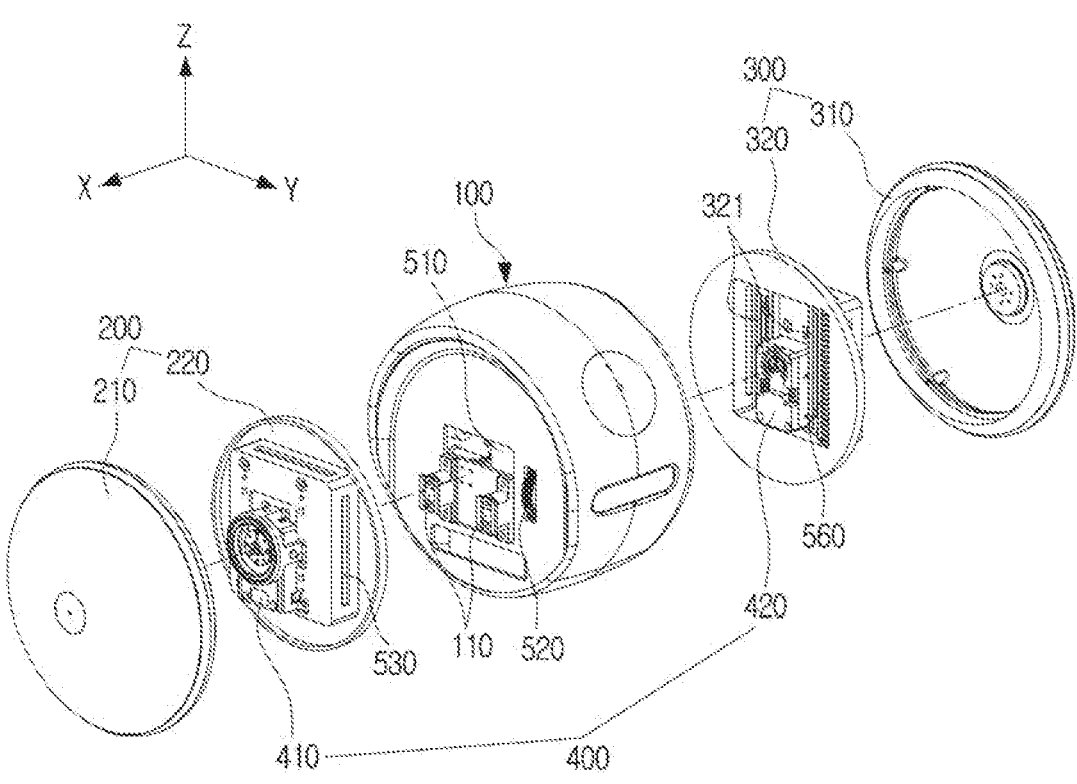
FIG. 7 is an exploded perspective view of a mobile robot apparatus according to one or more embodiments of the disclosure.
Figure 8:
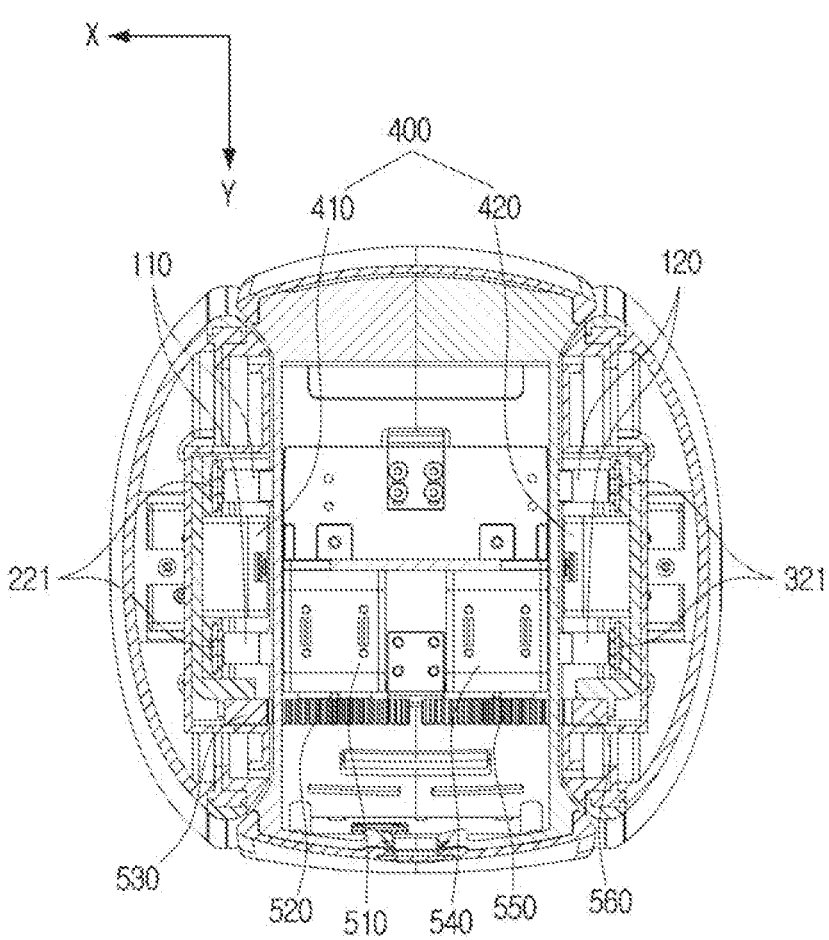
FIG. 8 is a cross-sectional view wherein the mobile robot apparatus illustrated in FIG. 1 was cut according to the I-I line.
Figure 9:
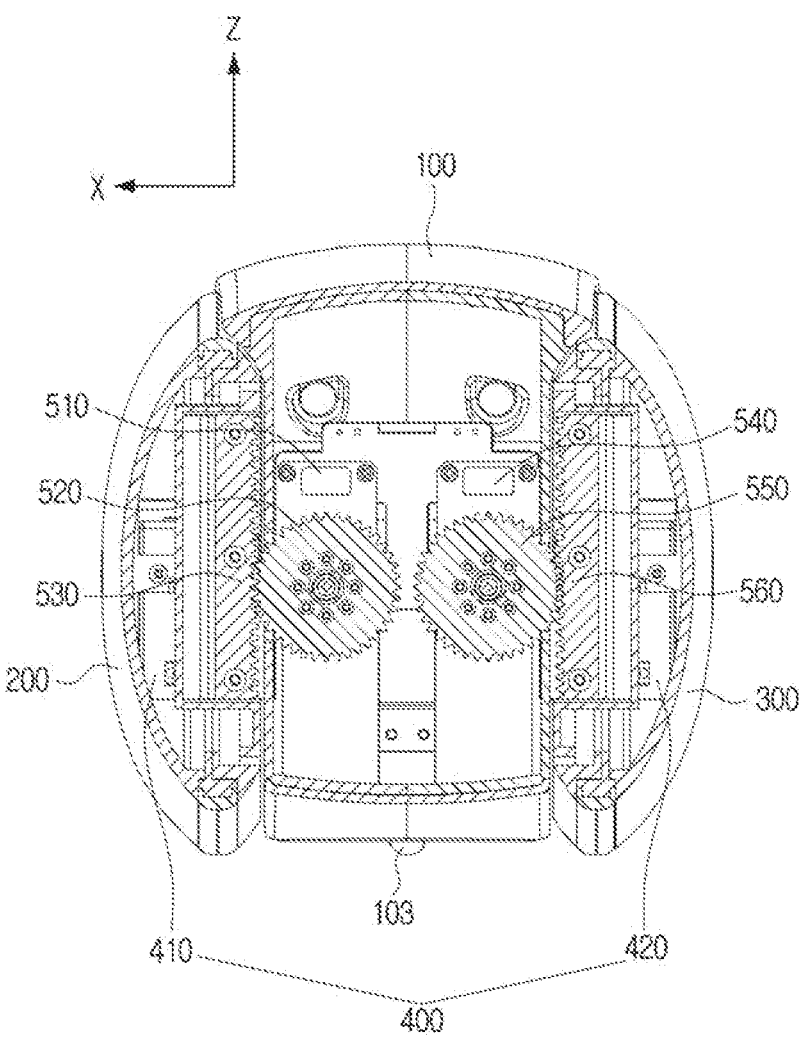
FIG. 9 is a cross-sectional view wherein the mobile robot apparatus illustrated in FIG. 1 was cut according to the II-II line.
Figure 10:
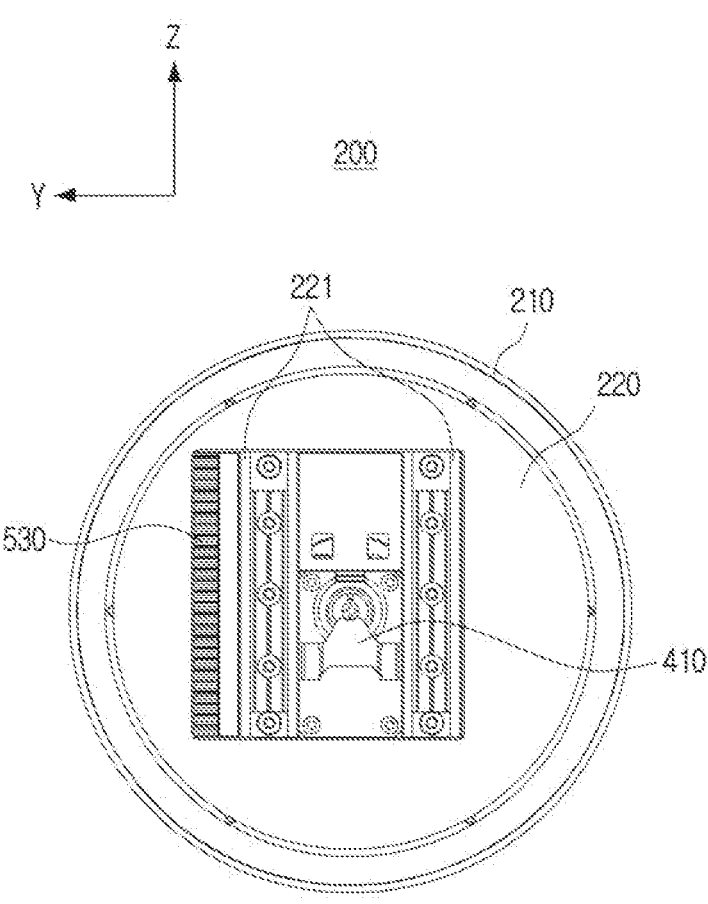
FIG. 10 is a side surface view of a first wheel according to one or more embodiments of the disclosure.

FIG. 7 is an exploded perspective view of a mobile robot apparatus according to one or more embodiments of the disclosure. FIG. 8 is a cross-sectional view wherein the mobile robot apparatus illustrated in FIG. 1 was cut according to the I-I line. FIG. 9 is a cross-sectional view wherein the mobile robot apparatus illustrated in FIG. 1 was cut according to the II-II line. FIG. 10 is a side surface view of a first wheel according to one or more embodiments of the disclosure.

Referring to FIG. 7 to FIG. 10, the first wheel 200 may include a first wheel cover 210 and a first middle member 220, and the second wheel 300 may include a second wheel cover 310 and a second middle member 320.

Also, the first driving device 400 may include a first motor 410 providing a driving force to the first wheel 200 and a second motor 420 providing a driving force to the second wheel 300.

Further, the second driving device 500 may include racks 530, 560 arranged on at least one of the first and second wheels 200, 300, and pinions 520, 550 arranged to be engaged with the racks 530, 560 inside the main body 100.

The first and second wheel covers 210, 310 respectively be rotatably connected to the first and second middle members 220, 320 that do not rotate. Also, both sides of the main body 100 may respectively be connected to the first and second middle members 220, 320 to be rotatable up and down.

That is, the first and second wheel covers 210, 310 may rotate based on the first and second middle members 220, 320, and the main body 100 may move up and down based on the first and second middle members 220, 320.

The first and second middle members 220, 320 may be arranged between the wheel covers 210, 310 and the main body 100, and support the first driving device 400, the racks 530, 560, and the guide rails 221, 321.

The first motor 410 may be arranged on the first middle member 220 and rotate the first wheel cover 210, and the second motor 420 may be arranged on the second middle member 320 and rotate the second wheel cover 310.

Specifically, the second driving device 500 may include a third motor 510, a first pinion 520, a first rack 530, a fourth motor 540, a second pinion 550, and a second rack 560.

The first pinion 520 may be arranged to be engaged with the first rack 530 inside the main body 100, and the first rack 530 may be arranged inside the first wheel 200.

If the third motor 510 rotates the first pinion 520, the first pinion 520 may move along the first rack 530. Accordingly, the main body 100 and the first wheel 200 may relatively move up and down.

The second pinion 550 may be arranged to be engaged with the second rack 560 inside the main body 100, and the second rack 560 may be arranged inside the second wheel 300.

If the fourth motor 540 rotates the second pinion 550, the second pinion 550 may move along the second rack 560. Accordingly, the main body 100 and the second wheel 300 may relatively move up and down.

The first and second racks 530, 560 may be arranged perpendicularly. Accordingly, the main body 100 may move in a direction perpendicular to the ground surface relatively to the first and second wheels 200, 300.

Also, the first and second racks 530, 560 may respectively be arranged on the first and second middle members 220, 320. Accordingly, the first and second racks 530, 560 maintain specific shapes regardless of the rotations of the first and second wheel covers 210, 310, and thus the main body 100 may stably move up and down relatively to the first and second middle members 220, 320.

As described above, as the second driving device includes a pair of motors 510, 540, pinions 520, 550, and racks 530, 560, the main body 100 may stably move up and down.

Also, the mobile robot apparatus 1 may further include guide rails 221, 321 arranged on at least one of the first and second middle members 220, 320, and the main body 100 may include blocks 110, 120 that are movable along the guide rails 221, 321 on the sides.

Specifically, the first guide rail 221 may be arranged on the first middle member 220, and the second guide rail 321 may be arranged on the second middle member 320. The first and second guide rails 221, 321 may be arranged perpendicularly.

Also, the main body 100 may include a first block 110 that is movable along the first guide rail 221 on one side, and a second block 120 that is movable along the second guide rail 321 on the other side.

As the first and second blocks 110, 120 of the main body 100 move while being respectively coupled with the first and second guide rails 221, 321, the main body 100 may move up and down relatively to the first and second middle members 220, 320. Also, as the first and second guide rails 221, 321 guide the moving path of the main body 100, the main body 100 may move up and down more stably.

Figure 11:
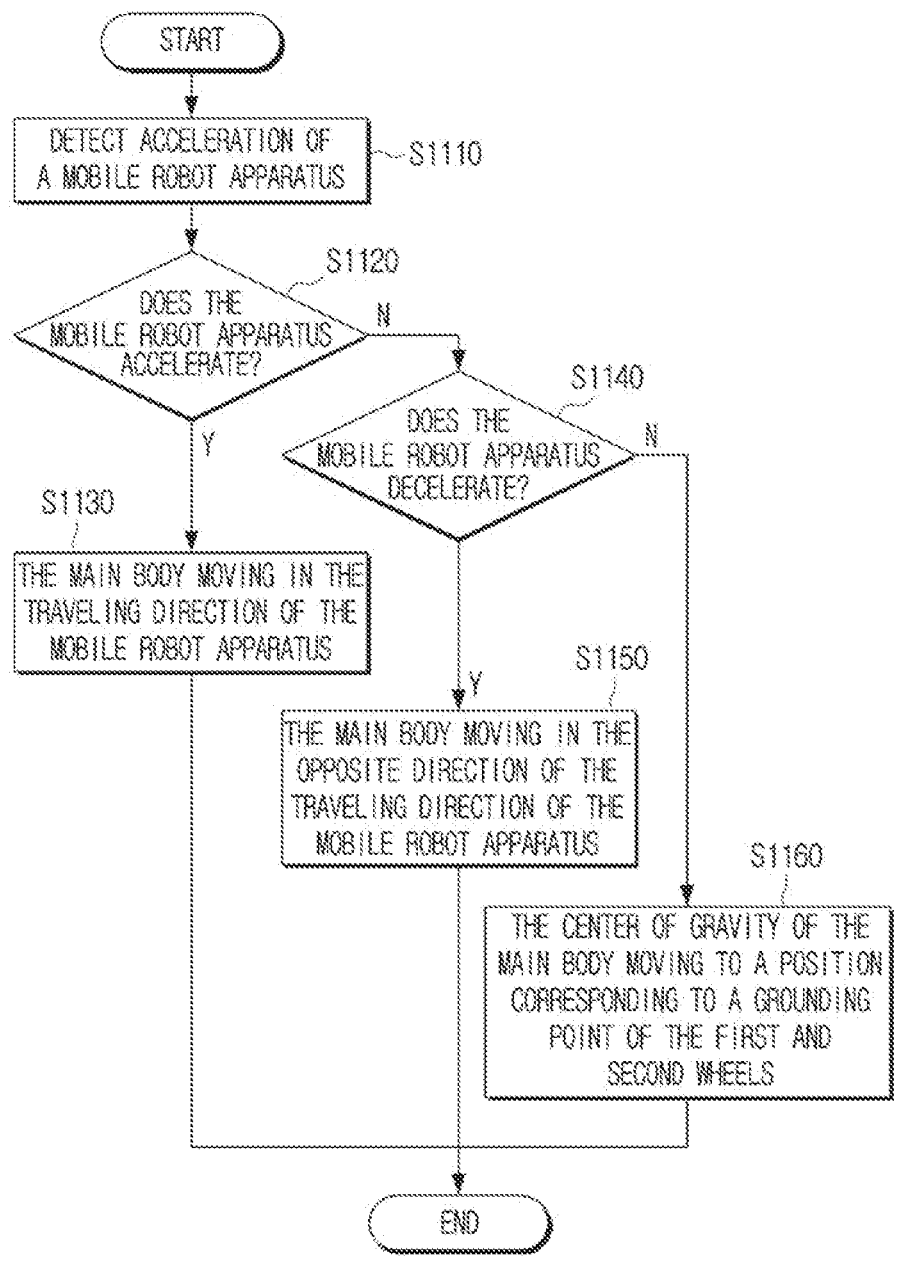
FIG. 11 is a flow chart for illustrating a control method for a mobile robot apparatus according to one or more embodiments of the disclosure.

FIG. 11 is a flow chart for illustrating a control method for a mobile robot apparatus according to one or more embodiments of the disclosure.

Referring to FIG. 11, a control method for the mobile robot apparatus 1 wherein a first wheel 200 and a second wheel 300 are respectively arranged at both sides of the main body 100 according to one or more embodiments of the disclosure may include the operations of sensing the acceleration of the mobile robot apparatus 1 (S1110), identifying whether the mobile robot apparatus 1 accelerates (S1120), and based on the mobile robot apparatus 1 accelerating, the main body 100 moving in the traveling direction of the mobile robot apparatus 1 (S1130), identifying whether the mobile robot apparatus 1 decelerates (S1140), and based on the mobile robot apparatus 1 decelerating, the main body 100 moving in the opposite direction of the traveling direction of the mobile robot apparatus 1 (S1150).

Also, the main body 100 may rectilinearly move along a reference axis S inclined at a predetermined angle θ more forward than the vertical line Z2.

In addition, the operation of moving in the traveling direction (S1130) may include the operations of, based on the mobile robot apparatus 1 accelerating forward, the main body 100 moving to a first position wherein the center of gravity M of the main body 100 is located more forward than the grounding point C of the first and second wheels 200, 300, and based on the mobile robot apparatus 1 accelerating backward, the main body 100 moving to a second position wherein the center of gravity M of the main body 100 is located more backward than the grounding point C of the first and second wheels 200, 300.

Also, the operation of traveling in the opposite direction of the traveling direction (S1150) may include the operations of, based on the mobile robot apparatus 1 decelerating forward, the main body 100 moving to the second position, and based on the mobile robot apparatus 1 decelerating backward, the main body 100 moving to the first position.

Accordingly, in the mobile robot apparatus 1, an inertia torque by acceleration or deceleration and a compensation torque by the center of gravity of the main body 100 are offset with each other, and thus the mobile robot apparatus 1 may travel stably without being inverted to the front side or the rear side.

Also, the control method for the mobile robot apparatus 1 may further include the operation of, based on the mobile robot apparatus 1 not accelerating or decelerating, the center of gravity M of the main body 100 moving to a position corresponding to the grounding point C of the first and second wheels 200, 300 (S1160).

That is, in case the mobile robot apparatus 1 moves at a constant velocity, the center of gravity M of the main body 100 may move to a third position arranged between the first position and the second position. Accordingly, the mobile robot apparatus 1 does not receive both of an inertia torque by acceleration or deceleration and a compensation torque by the center of gravity of the main body 100, and thus the mobile robot apparatus 1 may travel stably without being inverted to the front side or the rear side.

While preferred embodiments of the disclosure have been shown and described, the disclosure is not limited to the aforementioned specific embodiments, and it is apparent that various modifications can be made by those having ordinary skill in the art to which the disclosure belongs, without departing from the gist of the disclosure as claimed by the appended claims, and such modifications are within the scope of the descriptions of the claims.

What is claimed is:

1. A mobile apparatus comprising:
a main body;
a first wheel and a second wheel respectively provided on opposite sides of the main body;
a first driving device configured to rotate the first wheel and the second wheel;
a second driving device configured to rectilinearly move the main body along a reference axis that is offset from a vertical line in a direction toward a front of the main body by a predetermined angle; and
at least one processor configured to:
based on the mobile apparatus accelerating, control the second driving device to cause the main body to move in a traveling direction of the mobile apparatus,
based on the mobile apparatus decelerating, control the second driving device to cause the main body to move in a direction opposite to the traveling direction, and cause the main body to move to a first position at which a center of gravity of the main body is located forward from a grounding point of the first wheel and a grounding point of the second wheel or to move to a second position at which the center of gravity of the main body is located behind the grounding point of the first wheel and the grounding point of the second wheel,
wherein the main body is configured to be movable in a vertical direction with respect to the first wheel and the second wheel.

2. The mobile apparatus of claim 1, wherein the at least one processor is further configured to:
based on the mobile apparatus accelerating forward or decelerating backward, control the second driving device to cause the main body to move to the first position, and
based on the mobile apparatus decelerating forward or accelerating backward, control the second driving device to cause the main body to move to the second position.

3. The mobile apparatus of claim 2, wherein the at least one processor is further configured to, based on the mobile apparatus moving at a constant velocity, control the second driving device to cause the main body to move to a third position between the first position and the second position.

4. The mobile apparatus of claim 1, further comprising:
a tilt sensor configured to detect a tilt of the main body.

5. The mobile apparatus of claim 4, wherein the at least one processor is further configured to control the first driving device to maintain the tilt of the main body while the mobile apparatus is moving based on a signal received from the tilt sensor.

6. The mobile apparatus of claim 1, further comprising:
a camera configured to photograph a surrounding environment of the mobile apparatus.

7. The mobile apparatus of claim 6, wherein the camera is provided on a front surface of the main body.

8. The mobile apparatus of claim 1, further comprising:
an acceleration sensor configured to detect acceleration or deceleration of the mobile apparatus.

9. The mobile apparatus of claim 1, wherein the first driving device comprises:
a first motor configured to provide a driving force to the first wheel; and
a second motor configured to provide a driving force to the second wheel.

10. The mobile apparatus of claim 1, wherein the second driving device comprises:
a first rack provided inside the first wheel;
a second rack provided inside the second wheel;
a first pinion engaged with the first rack;
a second pinion engaged with the second rack;
a third motor configured to rotate the first pinion; and
a fourth motor configured to rotate the second pinion.

11. The mobile apparatus of claim 10,
wherein the first wheel comprises:
a first wheel cover that is rotatable; and
a first middle member between the first wheel cover and the main body,
wherein the second wheel comprises:
a second wheel cover that is rotatable; and
a second middle member between the second wheel cover and the main body, and
wherein the first rack is provided on the first middle member, and the second rack is provided on the second middle member.

12. The mobile apparatus of claim 11, further comprising:

a guide rail arranged on at least one of the first middle member and the second middle member, wherein the main body comprises a block that is movable along the guide rail.

13. A method of controlling a mobile apparatus comprising a main body and a first wheel and a second wheel respectively provided at both sides of the main body, the method comprising:

based on sensing acceleration of the mobile apparatus, causing the main body of the mobile apparatus to move in a traveling direction of the mobile apparatus;

based on sensing a deceleration of the mobile apparatus, causing the main body to move in a direction opposite from the traveling direction; and causing the main body to move to a first position at which a center of gravity of the main body is located forward from a grounding point of the first wheel and a grounding point of the second wheel or to move to a second position at which the center of gravity of the main body is located behind the grounding point of the first wheel and the grounding point of the second wheel, wherein the main body is configured to rectilinearly move along a reference axis that is offset from a vertical line in a direction toward a front of the main body by a predetermined angle, and wherein the main body is configured to be movable in a vertical direction with respect to the first wheel and the second wheel.

14. The method of claim 13, wherein the causing the main body of the mobile apparatus to move in the traveling direction comprises:

based on the mobile apparatus accelerating forward, causing the main body to move to the first position at which the center of gravity of the main body is located forward from the grounding point of the first wheel and a grounding point of the second wheel; and based on the mobile apparatus accelerating backward, causing the main body to move to the second position at which the center of gravity of the main body is located behind the grounding point of the first wheel and the second wheel, and wherein the causing the main body of the mobile apparatus to move in the direction opposite from the traveling direction comprises:

based on the mobile apparatus decelerating forward, causing the main body to move to the second position; and based on the mobile apparatus decelerating backward, causing the main body to move to the first position.

* * * * *